US010996158B2

United States Patent
Krantz et al.

(10) Patent No.: US 10,996,158 B2
(45) Date of Patent: May 4, 2021

(54) METHOD AND ARRANGEMENT FOR DETERMINING AT LEAST ONE PORE-RELATED PARAMETER OF A POROUS STRUCTURE

(71) Applicant: Nanyang Technological University, Singapore (SG)

(72) Inventors: William Bernard Krantz, Singapore (SG); Jia Wei Chew, Singapore (SG); Farhad Zamani, Singapore (SG)

(73) Assignee: Nanyang Technological University, Singapore (SG)

( * ) Notice: Subject to any disclaimer, the term of this patent is extended or adjusted under 35 U.S.C. 154(b) by 321 days.

(21) Appl. No.: 16/311,037

(22) PCT Filed: Jun. 21, 2017

(86) PCT No.: PCT/SG2017/050311
§ 371 (c)(1),
(2) Date: Dec. 18, 2018

(87) PCT Pub. No.: WO2017/222475
PCT Pub. Date: Dec. 28, 2017

(65) Prior Publication Data
US 2019/0226971 A1 Jul. 25, 2019

(30) Foreign Application Priority Data

Jun. 22, 2016 (SG) .......................... 10201605162U

(51) Int. Cl.
*G01N 15/08* (2006.01)
*B01D 65/10* (2006.01)
(Continued)

(52) U.S. Cl.
CPC ......... *G01N 15/0893* (2013.01); *B01D 65/10* (2013.01); *B01D 69/06* (2013.01); *B01D 69/08* (2013.01); *G01N 15/0806* (2013.01)

(58) Field of Classification Search
CPC .............................. G01N 15/08; G01N 15/088
See application file for complete search history.

(56) References Cited

U.S. PATENT DOCUMENTS 2,465,948 A * 3/1949 Weige ..................... G01N 15/08
73/38
2,534,737 A * 12/1950 Rose ..................... G01N 33/241
73/38

(Continued)

FOREIGN PATENT DOCUMENTS

WO   WO 2015/053709 A1   4/2015
WO   WO 2017/135892 A1   8/2017

OTHER PUBLICATIONS

International Search Report and Written Opinion for Application No. PCT/SG2017/050037 dated Mar. 27, 2017, 10 pages.
(Continued)

*Primary Examiner* — David A. Rogers
(74) *Attorney, Agent, or Firm* — Alston & Bird LLP

(57) ABSTRACT

In the present invention, a method for determining at least one pore-related parameter of a porous structure is provided. In a preferred embodiment, an enhanced evapoporometry (EP) technique is provided to determine pore size distribution of continuous pores of a porous structure. In this enhanced EP technique, a volatile liquid, such as isopropyl alcohol or water, is supplied to one side of a porous structure in order to enable the volatile liquid to penetrate and saturate the porous structure through capillary force. Thereafter, an immiscible non-volatile liquid, such as glycerol, mineral oils, silicon oils or hydrophilic ionic liquid, is supplied to the one side of the porous structure. As the volatile liquid
(Continued)

evaporates progressively from the filled pores, the emptied pores may be immediately filled by the non-volatile liquid drawn upwards by capillary action. This prevents formation of a t-layer formed from the adsorption of vapour emanating from the volatile liquid that is used to saturate the pores.

20 Claims, 7 Drawing Sheets

(51) Int. Cl.
*B01D 69/06* (2006.01)
*B01D 69/08* (2006.01)

(56) References Cited

U.S. PATENT DOCUMENTS

| | | | | |
|---|---|---|---|---|
| 2,612,036 | A * | 9/1952 | Angona | G01N 15/08 |
| | | | | 73/38 |
| 2,706,904 | A * | 4/1955 | Hertel | G01N 15/0826 |
| | | | | 73/38 |
| 3,939,698 | A | 2/1976 | De Lacy | |
| 5,002,399 | A | 3/1991 | Akine et al. | |
| 6,298,711 | B1 * | 10/2001 | Volfkovich | G01N 5/04 |
| | | | | 73/38 |
| 6,684,685 | B2 * | 2/2004 | Gupta | G01N 15/0826 |
| | | | | 73/38 |
| 6,789,410 | B1 * | 9/2004 | Gupta | G01N 15/0826 |
| | | | | 73/38 |
| 7,614,279 | B2 * | 11/2009 | Gupta | G01N 15/08 |
| | | | | 210/85 |
| 7,882,726 | B2 * | 2/2011 | Gupta | G01N 15/088 |
| | | | | 73/38 |
| 8,528,384 | B2 * | 9/2013 | Huang | G01N 15/088 |
| | | | | 73/38 |
| 9,618,441 | B2 * | 4/2017 | Greenberg | G01N 5/04 |
| 10,078,044 | B2 * | 9/2018 | Akhondi | B01D 65/10 |
| 2003/0233865 | A1 * | 12/2003 | Gupta | G01N 15/0826 |
| | | | | 73/38 |
| 2005/0034507 | A1 | 2/2005 | Volfkovich et al. | |
| 2013/0042670 | A1 | 2/2013 | Greenberg et al. | |
| 2014/0013833 | A1 * | 1/2014 | Hosoda | G01N 9/36 |
| | | | | 73/73 |
| 2015/0144552 | A1 * | 5/2015 | Chen | B01D 71/34 |
| | | | | 210/500.4 |
| 2016/0252444 | A1 * | 9/2016 | Akhondi | G01N 15/088 |
| | | | | 73/38 |
| 2019/0226971 | A1 * | 7/2019 | Krantz | B01D 69/06 |

OTHER PUBLICATIONS

Akhondi, E. et al., *Improved Design and Protocol for Evapoporometry Determination of the Pore-Size Distribution*, Journal of Membrane Science 496 (2015) 334-343.

International Search Report/Written Opinion for Application No. PCT/SG2017/050311 dated Aug. 22, 2017, 10 pages.

Singapore Application No. 10201600868V filed Feb. 4, 2016, entitled *Characterizing the Pore-Size Distribution (PSD) of Hollow Fibers and Tubular Membranes With Selective Layers on the Lumen Side by Evaporative Mass Loss*, 7 pages.

*Pore Size Analysis of Hollow Fiber Membranes by Porometry*, Saved from URL: https://www.azom.com/article.aspx?ArticleID-9430 (dated Jun. 28, 2013) 9 pages.

Hofs, B. et al., *Comparison of Ceramic and Polymeric Membrane Permeability and Fouling Using Surface Water*, Separation and Purification Technology 79 (2011) 365-374.

Zamani, F. et al., *Evapoporometry Adaptation to Determine the Lumen-Side Pore-Size Distribution (PSD) of Hollow Fiber and Tubular Membranes*, Journal of Membrane Science 526 (2017) 1-8.

\* cited by examiner

- arrange the porous structure in the test cell — 102
- supply a volatile liquid to the first space — 104
- supply a non-volatile liquid to the first space — 106
- determine an effective mass of the test cell over a period of time — 108
- determine the at least one pore-related parameter of the porous structure — 110

METHOD AND ARRANGEMENT FOR DETERMINING AT LEAST ONE PORE-RELATED PARAMETER OF A POROUS STRUCTURE

CROSS-REFERENCE TO RELATED APPLICATIONS

This application is a National Stage Entry of International Application No. PCT/SG2017/050311, filed Jun. 21, 2017, which claims the benefit of priority of Singapore application No. 102016051620, filed 22 Jun. 2016, the contents of each being hereby incorporated by reference in their entirety for all purposes.

TECHNICAL FIELD

Various embodiments relate to a method for determining at least one pore-related parameter of a porous structure. Various embodiments relate to an arrangement for determining at least one pore-related parameter of a porous structure.

BACKGROUND

It may be necessary to characterize the pore size and pore-size distribution for a variety of applications involving porous materials. For example, it may be necessary to accurately characterize the pore size and pore-size distribution of semi-permeable membranes that are used for applications such as water desalination, industrial gas separations, renal dialysis, membrane-lung oxygenators, controlled release drug-delivery devices, and membrane sensors. In these applications, the pore size determines the ability of the membrane to retain larger particles, bacteria, macromolecules, molecular aggregates, and/or molecules, relative to the liquid/gas that permeates through the membrane.

It may also be necessary to characterize the pore size and pore-size distribution for porous electrodes used in batteries and fuel cells. In these applications, the pore size determines the available surface area for charge transfer. Another application relates to porous catalysts used in a variety of chemical processes. The pore size of the catalysts may determine the available surface area for the heterogeneous catalytic reaction.

Current state-of-the-art methods may not be capable of determining pore sizes over the full range of interest, which may range from the nanometer scale up to the micron scale. Techniques such as displacement porometry may require relatively expensive dedicated equipment that involves the application of high pressures which can deform the material being studied. Moreover, displacement porometry can characterize only relatively large pores typically greater than 0.01 microns. Gas adsorption/desorption based techniques require relatively expensive dedicated equipment that involves measuring the gas pressure very accurately. Moreover, gas adsorption/desorption relies on a phenomenon known as capillary condensation whereby pores fill by progressive adsorption. For this reason gas adsorption/desorption can accurately characterize only relatively small pores typically less than 0.01 microns. The equipment required for scanning electron microscopy is very expensive. Further, scanning electron microscopy can measure the pore size for a sample area of only a few hundred microns in width on a planar area. As such, scanning electron microscopy does not characterize the pore size throughout a porous sample of interest.

Other less commonly used pore-size characterization techniques such as thermoporometry and permporometry also require dedicated relatively expensive equipment and are difficult to implement reliably.

SUMMARY

Various embodiments may provide a method for determining at least one pore-related parameter of a porous structure. The method may include arranging the porous structure in the test cell so that a first space is at least partially defined by a first surface of the porous structure and a second space is at least partially defined by a second surface of the porous structure opposite the first surface. The method may also include supplying or providing a volatile liquid to the first space so that one or more continuous pores of the porous structure are filled or saturated with the volatile liquid. The method may further include supplying or providing a non-volatile liquid to the first space so that the non-volatile liquid fills or saturates the one or more continuous pores of the porous structure after the volatile liquid evaporates from the one or more continuous pores of the porous structure. The method may additionally include determining an effective mass of the test cell over a period of time due to evaporation of the volatile liquid from the one or more continuous pores. The method may also include determining the at least one pore-related parameter of the porous structure based on the effective mass determined.

Various embodiments may provide an arrangement for determining at least one pore-related parameter of a porous structure. The arrangement may include a test cell including the porous structure so that the test cell includes a first space at least partially defined by a first surface of the porous structure and a second space at least partially defined by a second surface of the porous structure opposite the first surface. The arrangement may also include a fluid delivery device configured to supply a volatile liquid into the first space so that one or more continuous pores of the porous structure are filled with the volatile liquid, and further configured to supply a non-volatile liquid into the first space so that the non-volatile liquid fills the one or more continuous pores of the porous structure after the volatile liquid evaporates from the one or more continuous pores of the porous structure. The arrangement may additionally include a mass-determination device configured to determine an effective mass of the test cell over a period of time due to evaporation of the volatile liquid from the one or more continuous pores. The at least one pore-related parameter of the porous structure may be determined based on the effective mass determined.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 1 is a schematic showing a method for determining at least one pore-related parameter of a porous structure according to various embodiments.

DETAILED DESCRIPTION

Figure 2:
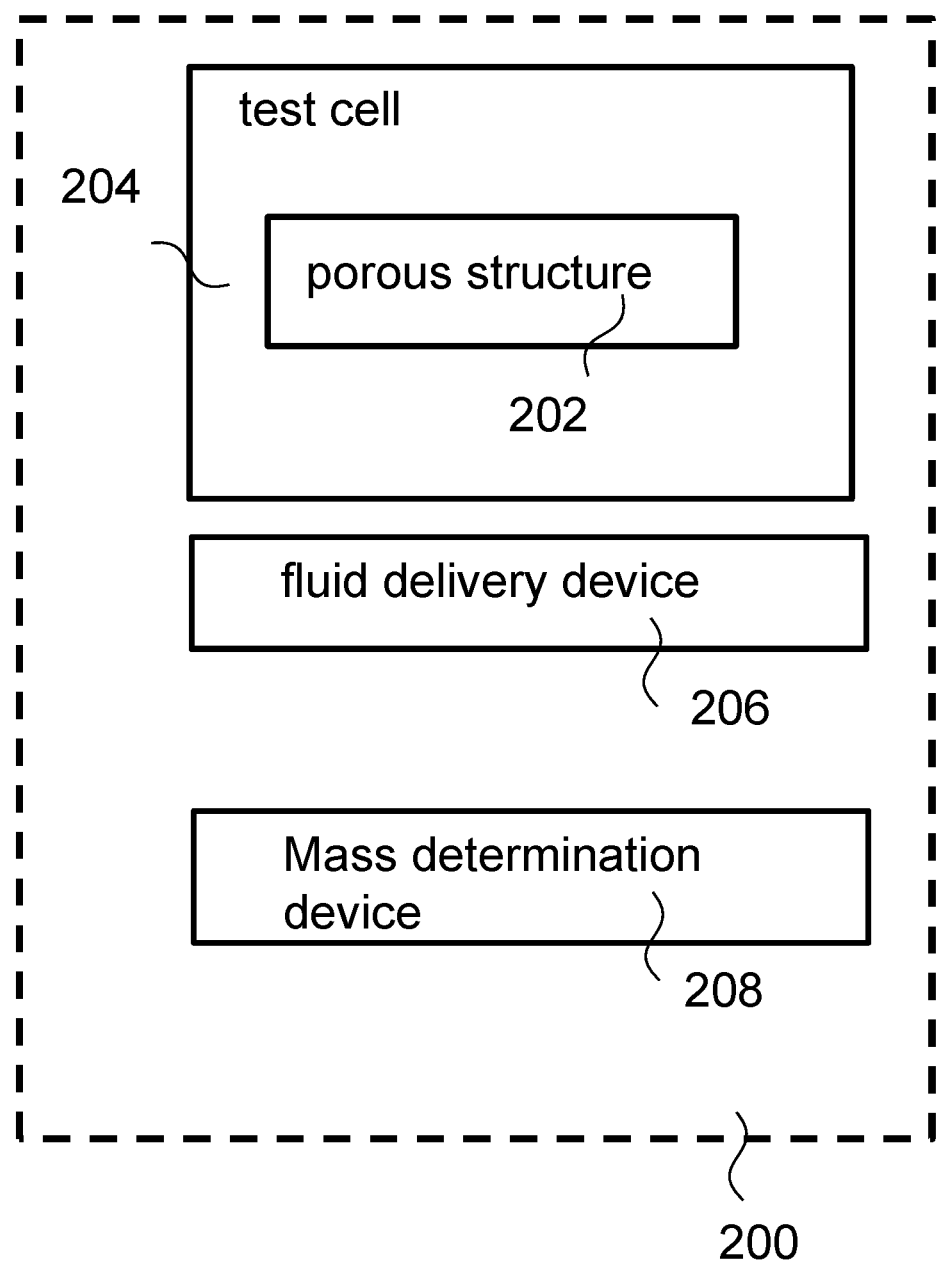
FIG. 2 is a schematic of an arrangement for determining at least one pore-related parameter of a porous structure according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or arrangements/devices are analogously valid for the other methods or arrangements/devices. Similarly, embodiments described in the context of a method are analogously valid for an arrangement/device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Evapoporometry (EP) may offer several advantages relative to the current state-of-the-art methods for determining pore size and pore-size distribution.

Evapoporometry determines the pore size based on the evaporative mass loss from porous materials that have been pre-saturated with either a wetting or non-wetting volatile liquid. The principle underlying evapoporometry is that the vapor pressure would be reduced for wetting liquids, whereas it would be increased for non-wetting liquids owing to the effects of surface curvature at the interface between a liquid within pores and the ambient gas phase.

Evapoporometry involves placing a porous structure or porous material that has been saturated with a volatile liquid in an appropriate test cell that in turn is placed on a microbalance. The microbalance permits measuring the mass as a function of time.

The evaporation rate is indicated by the slope of the mass versus time curve. The evaporation rate can be related to the vapor pressure at the interface between the liquid in the porous material and the ambient gas phase. The vapor pressure in turn is related to the pore diameter. If the porous material is pre-saturated with a wetting volatile liquid or non-wetting volatile liquid, the evaporation rate monotonically decreases as a function of time.

A wetting volatile liquid evaporates progressively from the largest pores down to the smallest pores as the vapor pressure decreases with decreasing pore diameter. At any instant of time, the wetting volatile liquid evaporates from only one pore size, since the test cell used in evapoporometry is designed to ensure that the ambient gas phase environment above any smaller pores is supersaturated, whereas any larger pores would already have been emptied of the volatile wetting liquid.

On the other hand, a non-wetting volatile liquid evaporates progressively from the smallest pores up to the largest pores as the vapor pressure increases with decreasing pore diameter. At any instant of time, the non-wetting volatile liquid evaporates from only one pore size since the ambient gas phase environment above any larger pores is supersaturated, whereas any smaller pores would already have been emptied of the non-volatile wetting liquid.

Evapoporometry may allow the characterization the pore size from a few nanometers up to near micron-scale. Further, the equipment for evapoporometry, such as a microbalance, may be relatively inexpensive.

Current evapoporometry methods determine the pore-related parameters, such as pore-size distribution, of all pores, including continuous pores and dead-end pores, of a porous structure or material. A continuous pore may be defined as a pore that extends from a first surface or side of the porous structure or material to a second surface or side of the porous structure or material opposite the first surface or side. On the other hand, a dead-end pore may be defined as a pore that does not extend from a first surface or side of the porous structure or material to a second surface or side of the porous structure or material opposite the first surface or side. A dead-end pore may be exposed only on a single surface or side of the porous structure or material. The dead-end pore may extend from the single surface or side to terminate within the thickness of the porous structure or material.

Methods and arrangements related to evapoporometry are described in US2013/0042670 A1, WO 2015/053709 A1 and PCT Application No. PCT/SG2017/050037, which are incorporated in their entirety herein.

Some applications may require determining a pore-related parameter, such as pore-size distribution, of only the continuous pores of a porous structure or material. For instance, one may like to know the pore-size distribution of the continuous pores of a micro-porous membrane used in water treatment as the continuous pores allow some components such as water to pass through the membrane while stopping or trapping other components such as particulates or bacteria. The method for determining the pore-related parameters of just the continuous pores may also be applicable to porous electrodes and/or porous catalysts.

Further, the pore-size distribution determined by current evapoporometry methods may be compromised by the presence of a t-layer, i.e., an adsorbed layer of the vapor emanating from the volatile liquid used to saturate the pores. The t-layer may be caused by adsorption of the vapor of the volatile liquid onto the walls of the empty pores from which the volatile liquid has evaporated. The thickness of the t-layer may typically range from a fraction of a nanometer to 5 nanometers. As such, the residual t-layer may cause the pore diameter of the smaller pores to be underestimated. The t-layer may cause the pore-size distribution to include a range of nanometer scale pores that arise due to evaporation of the volatile wetting liquid from the t-layer. These nanometer scale pores may not be real pores but may be artifacts caused by the presence of the t-layer.

Various embodiments may have advantages over current evapoporometry methods or may seek to address issues facing current evapoporometry methods. Various embodiments may determine only a pore-related parameter of only the continuous pores and/or may avoid the formation of an adsorbed t-layer. Various embodiments may determine the pore-size distribution and/or other parameters of the continuous pores only. Various embodiments may avoid complications due to the adsorbed t-layer of vapor on the walls of the pores.

To achieve the above, the design of the test cell and method of containment for the porous sample to determine the pore-size distribution of only the continuous pores may be different from what is disclosed in US2013/0042670.

Various embodiments may relate to the design of the test cell, design of the sample containment, and/or the procedure for saturating the pores of the membrane or porous material.

FIG. 1 is a schematic showing a method for determining at least one pore-related parameter of a porous structure according to various embodiments. The method may include, in 102, arranging the porous structure in the test cell so that a first space is at least partially defined by a first surface of the porous structure and a second space is at least partially defined by a second surface of the porous structure opposite the first surface. The method may also include, in 104, supplying or providing a volatile liquid to the first space so that one or more continuous pores of the porous structure are filled or saturated with the volatile liquid. The method may further include, in 106, supplying or providing a non-volatile liquid to the first space so that the non-volatile liquid fills or saturates the one or more continuous pores of the porous structure after the volatile liquid evaporates from the one or more continuous pores of the porous structure. The method may additionally include, in 108, determining an effective mass of the test cell over a period of time due to evaporation of the volatile liquid from the one or more continuous pores. The method may also include, in 110, determining the at least one pore-related parameter of the porous structure based on the effective mass determined.

In other words, the porous structure may be arranged within a test cell such that the test cell is separated into a first space at least partly defined by the first surface of the porous structure and a second space at least partly defined by the second surface of the porous structure. The first surface of the porous structure may be in fluidic communication with the second surface of the porous structure opposing the first surface only via the one or more continuous pores. Volatile liquid may be provided to the first surface of the porous structure (via the first space) to saturate the one or more continuous pores. Non-volatile liquid may then be provided to the first surface of the porous structure (via the first space) so that the non-volatile liquid replaces the volatile liquid in the continuous pores after the volatile liquid evaporates through the second surface of the porous structure (into the second space). The volatile liquid may subsequently evaporate from the second space out of the test cell. The method may include determining a difference in effective mass over a duration to calculate the amount of volatile liquid evaporated from the one or more continuous pores. The method may include determining the pore-related parameter based on the amount of volatile liquid evaporated.

In the current context, the porous structure may also be referred to as a porous material.

In various embodiments, the porous structure may be a sheet membrane, such as a flat sheet membrane.

The test cell may include a base including a cavity, and a chamber. Arranging the sheet membrane, e.g., flat sheet membrane, may include arranging the sheet membrane, e.g., flat sheet membrane, over or to cover the cavity so that the first space includes the cavity (and the second space includes the chamber). Arranging the sheet membrane, e.g., flat sheet membrane, may further include securing the sheet membrane to the base, e.g., using a clamping assembly or mechanism. The sheet membrane, e.g., flat sheet membrane, may be arranged over or to cover the cavity, and may be secured or attached to a part of the test cell or base such as a flange surrounding the cavity so that the first space is at least partially defined by the sheet membrane and surface(s) of the cavity. The second space may be at least be partially defined by the sheet membrane, e.g., flat sheet membrane, and a top part of the test cell, such as the lid and walls of the test cell or chamber. The test cell or base may include the fluid delivery device including an inlet channel configured to direct or channel the volatile liquid and the non-volatile liquid to the cavity. In other words, the first space may be or may include the part of the test cell (the cavity of the base) to which the volatile and non-volatile liquids are supplied, and the second space may be or may include the part of the test cell (chamber) to which the volatile liquid evaporates to from the porous structure.

If the non-volatile liquid is denser than the volatile liquid, the non-volatile liquid may be introduced so that it underlies the volatile liquid. The chamber may thus be on or over the base including the cavity. If the non-volatile liquid is less dense than the volatile liquid, the non-volatile liquid may be introduced so that the non-volatile liquid is over the volatile liquid. The test cell may be inverted with the base over the chamber.

In various other embodiments, the porous structure may be a hollow fiber. The first surface may be an inner surface of the hollow fiber, and the second surface may be an outer surface of the hollow fiber. In other words, the first space may be the space in the hollow of the fiber (defined by the inner surface of the hollow fiber), and the second space may be the space beyond the outer surface of the hollow fiber.

A plurality of hollow fibers may be used to obtain sufficient pores for accuracy. In other words, the method may include arranging a plurality of porous structures such as hollow fibers. Arranging the hollow fiber or each of the plurality of hollow fibers in the test cell may include sealing a first end or distal end of the hollow fiber(s) using a seal including a suitable sealant material or a suitable potting material. Alternatively, the first end or distal end may be sealed using heat sealing or any other suitable methods. Arranging the hollow fiber or each of the plurality of hollow fibers in the test cell may further include attaching a second end or proximal end of the hollow fiber(s) to a fluid delivery device. The fluid delivery device may include a tube and a distribution manifold attached to the tube. The second end of the hollow fiber(s) may be attached to or inserted into the distribution manifold. The fluid delivery device may be configured to direct the volatile liquid and the non-volatile liquid to the first space, which may be at least partially defined by the inner surface of the hollow fiber(s) and the seal. The second space may be at least partially be defined by the outer surface of the hollow fibers, and a part of the test cell or chamber such as the lid and walls of the test cell or chamber.

The distribution manifold may be attached to the second end of the hollow fiber(s). During operation, the volatile liquid and/or the non-volatile liquid may be introduced into the tube, and be carried from the tube to the distribution manifold. The volatile liquid and/or the non-volatile liquid may then be carried from the distribution manifold to the hollow fiber(s). The hollow fiber or the plurality of the hollow fibers may be attached to or inserted into the distribution manifold.

Supplying the volatile liquid into the first space may include supplying the volatile liquid so that the volatile liquid comes into contact with the first surface of the porous structure. Further, supplying the non-volatile liquid into the first space may include supplying the volatile liquid so that the non-volatile liquid comes into contact with the first surface of the porous structure.

The first surface of the porous structure may be in fluidic communication with the second surface of the porous structure only via the one or more continuous pores, and the first space may be in fluidic communication with the second space only via the one or more continuous pores, so the volatile liquid may be directed from the first space to the second space only via the one or more continuous pores.

The volatile liquid may be a volatile wetting liquid such as isopropyl or water. Other examples of volatile wetting liquids may include ethanol, isopropanol, l-butanol, l-hexanol, pentanol, heptanol, octanol, ethylene glycol, ethyl ether, methylene chloride, chloroform, carbon tetrachloride or water.

The non-volatile liquid may be provided or supplied after the volatile liquid is provided or supplied. The non-volatile liquid may be a non-volatile wetting liquid such as glycerol. Other examples of non-volatile wetting liquids may include mineral oils, glyercol, silicon oils or hydrophilic ionic liquids.

The volatile liquid may fill or saturate one or more dead-end pores extending from or on the first surface of the porous structure. However, the volatile liquid filled or saturated in the one or more dead-end pores extending from or on the first surface of the porous structure may be trapped in the one or more dead-end pores due to the non-volatile liquid provided or supplied to the cavity or first space (after the volatile liquid is provided or supplied). The volatile liquid and/or non-volatile liquid supplied or provided to the first space may not fill or saturate one or more dead-end pores extending from or on the second surface of the porous structure, since the one or more dead-end pores extending from or on the second surface do not extend through the porous structure to come into contact with the volatile liquid and/or non-volatile liquid.

Volatile liquid remaining in the cavity and not filled or saturated in the one or more continuous pores and the one or more dead-end pores on or extending from the first surface may evaporate through the largest continuous pores in the porous structure, which may cause the mass, volume, or number of the largest continuous pores to be overestimated. The overestimation may be addressed by forming a hole or a plurality of holes in the porous structure. Forming the hole or plurality of holes may include piercing or puncturing the porous structure. The hole or plurality of holes mat extend from a first side or surface of the porous structure to a second side or surface of the porous structure.

In various embodiments, the method may further include forming or puncturing a hole or a plurality of holes on the porous structure before supplying the volatile liquid and the non-volatile liquid. A diameter of the hole or each hole of the plurality of holes may be greater than a diameter of each of the one or more continuous pores.

Alternatively, the volatile liquid supplied may be substantially equal to an amount required to saturate the one or more continuous pores, and one or more dead-end pores on the first surface of the porous structure. In other words, the volatile liquid may be provided or supplied to the cavity or the first space in such a manner that that no excess volatile liquid remains in the cavity or the first space. The volatile liquid provided or supplied to the cavity or the first space may be entirely drawn into the one or more continuous pores as well as the one or more dead-end pores on or extending from the first surface of the porous structure.

The method may further include controlling evaporation of the volatile liquid in the test cell or chamber. Controlling evaporation of the volatile liquid in the test cell or chamber may include arranging a diffusional resistance element spaced over the porous structure. The diffusional resistance element may be configured to resist diffusion of vapour of the volatile liquid. The diffusional resistance element may include a lid. The lid may include an opening or hole inlet extending from a first surface of the lid to a second surface of the lid opposite the first surface of the lid. The volatile liquid evaporated from the one or more continuous pores may be directed through the opening or hole inlet out of the test cell or chamber.

The method may also include determining an evaporation rate from the effective mass determined. Determining an evaporation rate may include determining a plurality of instantaneous evaporation rates.

"Effective mass" as described herein may refer to the mass of the test cell 202 and its contents, for instance, including the volatile liquid and the non-volatile liquid provided or supplied, the porous structure 202. In various embodiments, the method may include determining the effective mass of the test cell over a period of time.

In various embodiments, the method may also include relating the evaporation rate to a vapour pressure of the volatile liquid at an interface between the volatile liquid in the porous structure and an ambient gas phase within the test cell or chamber. Determining the at least one pore-related parameter of the porous structure may include determining the at least one pore-related parameter based on the vapour pressure determined.

In various other embodiments, the method may include relating the evaporation rate to a mole fraction of the volatile liquid at an interface between the volatile liquid in the porous structure and an ambient gas phase within the test cell. Determining the at least one pore-related parameter of the porous structure may include determining the at least one pore-related parameter based on the mole fraction determined.

In various embodiments, determining an effective mass of the test cell over the time period may include determining the effective mass of the test cell at a series of time intervals (within the time period) to generate a plurality of instantaneous masses. The method may further include determining an instantaneous evaporation rate based on based on one or more of the plurality of instantaneous masses.

The at least one pore-related parameter may be or may include a pore-size distribution, a mass-average pore diameter, and/or a bulk porosity. Determining the pore-size distribution of the porous structure may include associating a respective instantaneous mass of the generated plurality of instantaneous masses to a respective pore diameter of the porous structure, and determining the pore-size distribution based on the plurality of instantaneous masses generated and the associated pore diameters. The pore-size distribution may refer to the number of pores with various pore diameters.

The at least one pore-related parameter of the porous structure may be a parameter of the one or more continuous pores of the porous structure.

In various embodiments, the method may include determining a mass-transfer coefficient of the volatile liquid. The determining of the mass-transfer coefficient may include supplying or providing the volatile liquid to the test cell, determining a change in mass of the test cell and the volatile liquid over a time period, and determining the evaporation rate based on the change. The method of determining the mass-transfer coefficient may be carried out before evapoporometry determination, i.e., before arranging the porous structure in the test cell.

The mass-transfer coefficient during evapoporometry determination may be substantially equal to the mass-transfer coefficient before evapoporometry determination. An instantaneous evaporation rate of the volatile liquid may be determined based on the instantaneous mass. An instantaneous mole fraction of the volatile liquid or vapour pressure of the volatile liquid may be determined based on the instantaneous evaporation rate and the mass-transfer coefficient. The one or more pore-related parameters may be determined based on the instantaneous mole fraction of the volatile liquid or the vapour pressure of the volatile liquid.

Generally speaking, the volatile liquid at the larger pores may evaporate, followed by the volatile liquid at the smaller pores. As such, the volatile liquid may evaporate progressively from the largest pores to the smallest pores since the vapour pressure decreases with decreasing pore diameter for a wetting liquid. No evaporation may occur from the smaller pores when evaporation is occurring from the larger pores as the ambient gas phase adjacent the volatile liquid in the smaller pores may be supersaturated. At any instant of time, liquid may be evaporating from only one pore size since the test cell may be configured to ensure that the ambient gas phase environment above any smaller pores is supersaturated, whereas the larger pores are already been emptied of liquid.

In various embodiments, the dead-end pores of the porous structure exposed to the second space, i.e., the dead-end pores of the second surface of the porous structure may not be saturated or filled with volatile liquid, since the volatile liquid is supplied or provided to the first space. Further, the volatile liquid in the dead-end pores on the first surface may not evaporate as the volatile liquid is blocked by the non-volatile liquid supplied or provided to the first space subsequently. Accordingly, the volatile liquid may evaporate only from the continuous pores and may not evaporate from the dead-end pores. The volatile liquid may evaporate progressively from the largest continuous pores to the smallest continuous pores.

FIG. 2 is a schematic of an arrangement 200 for determining at least one pore-related parameter of a porous structure 202 according to various embodiments. The arrangement 200 may include a test cell 204 including the porous structure so that the test cell 204 includes a first space at least partially defined by a first surface of the porous structure 202 and a second space at least partially defined by a second surface of the porous structure 202 opposite the first surface. The arrangement 200 may also include a fluid delivery device 206 configured to supply a volatile liquid into the first space so that one or more continuous pores of the porous structure 202 are filled with the volatile liquid, and further configured to supply a non-volatile liquid into the first space so that the non-volatile liquid fills the one or more continuous pores of the porous structure after the volatile liquid evaporates from the one or more continuous pores of the porous structure 202. The arrangement 200 may additionally include a mass-determination device 208 configured to determine an effective mass of the test cell 204 over a period of time due to evaporation of the volatile liquid from the one or more continuous pores. The at least one pore-related parameter of the porous structure 202 may be determined based on the effective mass determined.

In other words, the porous structure 202 may divide the test cell 204 into a first space and a second space, the one or more continuous pores of the porous structure 202 joining the first space and the second space. A fluid delivery device 206 may deliver a volatile liquid to the first space to fill or saturate the one or more continuous pores. The fluid delivery device 206 may further deliver a non-volatile liquid to the first space so that the non-volatile liquid may fill the one or more continuous pores after the volatile liquid evaporates from the one or more continuous pores through the second space and out of the test cell 204. The loss of mass due to evaporation of the volatile liquid may be determined via the mass-determination device 208. The pore-related parameter may be determined based on the loss of mass.

In various embodiments, the porous structure 202 may be a sheet membrane, e.g., a flat sheet membrane. The test cell 204 may include a base including a cavity, and a chamber. The sheet membrane may be arranged to cover or over the cavity so that the first space includes the cavity. The sheet membrane may be secured to the base. The base may include an inlet channel configured to direct the volatile liquid and the non-volatile liquid from the fluid delivery device 206 to the cavity.

In various embodiments, the porous structure 202 may be a sheet membrane secured over or covering a cavity of a base using a clamping assembly. A volatile liquid may be introduced into the cavity using the fluid delivery device 206 so that the volatile liquid may be drawn into the one or more continuous pores of the sheet membrane. A non-volatile liquid may then be introduced into the cavity using the fluid delivery device 206. The volatile liquid may travel from the cavity through the one or more continuous pores to the surface of the sheet membrane facing away from the cavity. As the volatile liquid evaporates from the surface of the sheet membrane facing away from the cavity, the non-volatile liquid may be drawn into the one or more continuous pores to replace the volatile liquid evaporated. The non-volatile liquid may help prevent formation of a t-layer of adsorbed volatile liquid or may reduce a thickness of the t-layer of adsorbed volatile liquid.

In various embodiments, the porous structure 202 may be a hollow fiber, e.g., a porous hollow fiber with one or more continuous pores extending from an inner surface defining a lumen of the hollow fiber to an outer surface of the hollow fiber. The first surface may be an inner surface of the hollow fiber, and the second surface may be an outer surface of the hollow fiber. In various embodiments, the arrangement 200 may include a plurality of porous structures such as hollow fibers.

A first end or distal end of the hollow fiber(s) may be sealed using a seal or material including a suitable sealant material or a suitable potting material. A second end or proximal end of the hollow fiber(s) may be attached to the fluid delivery device 206. The fluid delivery device 206 may be configured to direct the volatile liquid and the non-volatile liquid to the first space at least partially defined by the inner surface of the hollow fiber(s) and the seal. The fluid delivery device 206 may include a tube and the distribution manifold attached to the tube. The distribution manifold may also be attached to the second end of the hollow fiber(s).

In various embodiments, the hollow fiber(s) 202 may have one end sealed and another end coupled to the fluid delivery device 206. Volatile fluid may be channeled through the fluid delivery device 206 into the lumen of the hollow fiber(s). Subsequently, non-volatile fluid may be channeled through the fluid delivery device 206 into the lumen of the hollow fiber(s). The volatile fluid may be drawn through the one or more continuous pores to an outer surface of the hollow fiber(s). As the volatile fluid evaporates from the outer surface, the non-volatile fluid may be drawn into the one or more continuous pores to replace the volatile liquid evaporated. The non-volatile liquid may help prevent formation of a t-layer of volatile liquid or may reduce a thickness of the t-layer of volatile liquid. The volatile liquid may also be drawn into one or more dead-end pores on the inner surface of the hollow fiber(s) 206.

The arrangement 200 may also include an environmental chamber or incubator configured to maintain a temperature of the chamber or test cell. The temperature may be kept substantially constant. The arrangement 200 may also include an anti-vibration platform configured to support the mass-determination device 208.

The arrangement may also include a computer system coupled to the mass-determination device. The computer system may be configured to record the effective mass determined over time.

The mass-determination device 208, such as a microbalance, may be configured to determine an effective mass of the test cell 204 over a period of time. Determining the effective mass of the test cell 204 over a period of time may refer to determining a change in effective mass of the test cell 204 over time. The test cell 204 may be positioned on the mass-determination device 208. The mass-determination device 208 may be capable of measuring mass on the microgram level.

The vapour pressure of the volatile liquid and the vapour pressure of the non-volatile liquid may be different. The volatile liquid may have high vapour pressure at room temperature, while the non-volatile liquid may have a near-zero vapour pressure at room temperature. The volatile liquid may be a volatile wetting liquid. The non-volatile liquid may be a non-volatile wetting liquid.

Various embodiments may relate to a test cell design configured to introduce the volatile wetting liquid on the underside of a flat sheet membrane/porous material or on the lumen side of hollow fibers to avoid saturating the dead-end pores on the upper surface of a flat sheet membrane/porous material or the outer surface of hollow fiber membranes. Various embodiments may relate to introducing the volatile wetting liquid so that it contacts only one side of the membrane or porous material followed by introducing a non-volatile wetting liquid to prevent any evaporative loss of the volatile liquid through the pores that have been drained by evaporation and to prevent an adsorption of a t-layer of the vapor emanating from the volatile liquid.

Figure 3:
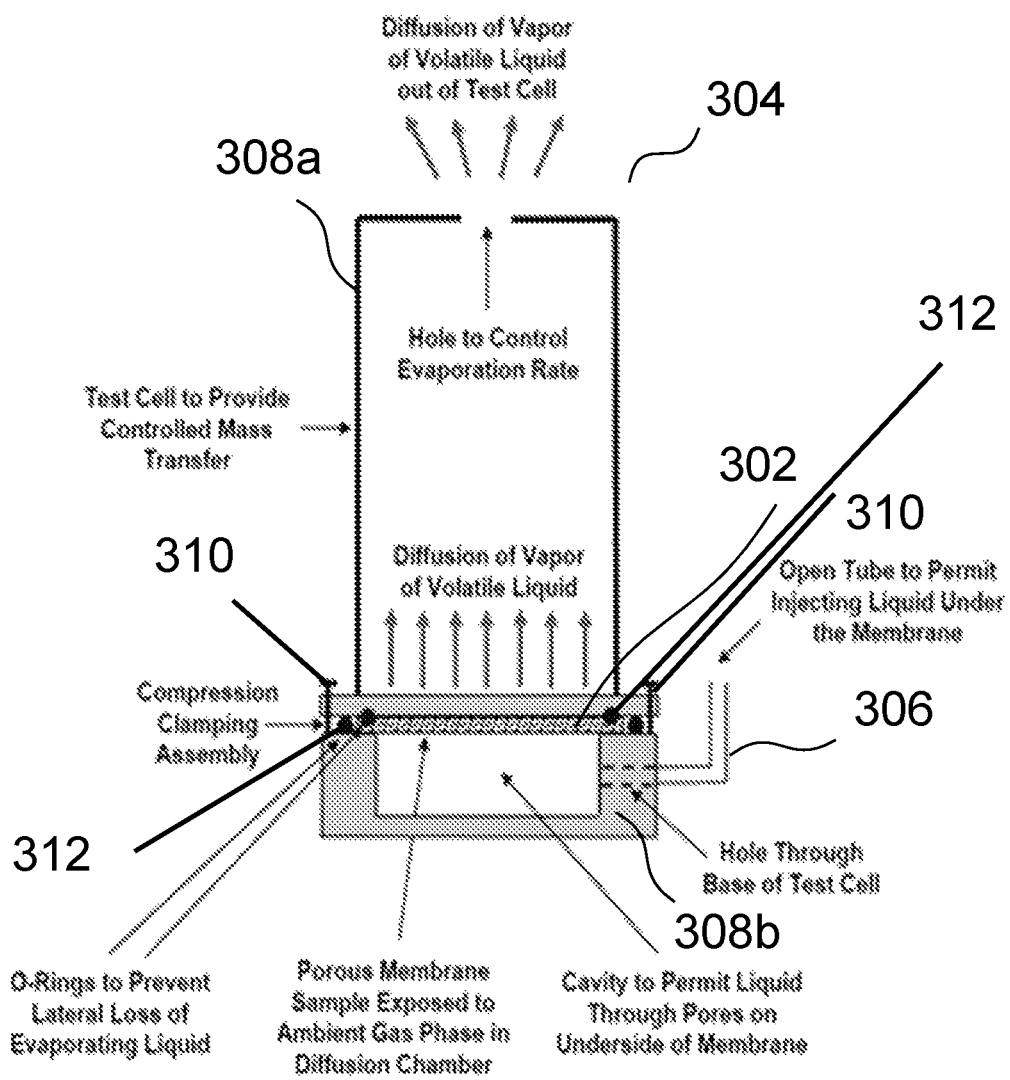
FIG. 3 shows a schematic of a test cell according to various embodiments.

FIG. 3 shows a schematic of a test cell 304 according to various embodiments. The test cell 304 may include a vertical chamber 308a over a base 308b including a cavity. The base 308b may be a base plate. A flat sheet membrane 302 or porous material may be held over the cavity via a compression clamping assembly 310. The compression clamping assembly 310 may include one or more clamps for holding or clamping the sheet membrane 302 or porous material to the base 308b. The chamber 308a may be attached to the base 308b via connectors such as threaded screws, nuts, bolts and/or other fasteners. The lower end of the test cell chamber 308a may be flanged so that it can be attached to the base 308b.

The upper end of the test cell chamber 308a may be fitted with a removable lid having a small hole whose size may be varied to control the evaporation rate of the volatile wetting liquid used to saturate the continuous pores of the membrane 302 or porous material being characterized by evapoporometry. The base plate 308b of the test cell 304 may have a shallow recessed cavity that may permit introducing a liquid under the flat sheet membrane 302 or porous material being characterized by evapoporometry. A small channel may pass horizontally from the cavity through the base 308b of the test cell 300 to a small tube 306. The small tube 306 may extend horizontally a small distance outside the test cell 304 and may be bent upward so that its open end faces upward. The small tube 306 may be used to introduce a liquid beneath the flat sheet membrane 302 or porous material so that only the continuous pores (and the dead-end pores of the surface facing the cavity) are saturated with the liquid.

The membrane or porous material whose pore-size distribution is to be characterized by evapoporometry may be placed near the bottom of the test cell 304 and may be seated on the horizontal flange in the base 308b of the test cell 304 so that the membrane or porous material overlies the cavity in the base plate 308b of the test cell 304. The test cell 300 may further include one or more thin vertical supports to prevent the flat sheet membrane 302 or porous material from sagging downward into the underlying cavity in the base 308b. The flat sheet membrane 302 or porous material may be sealed around its circumference with a seal 312 such as O-rings or other means to avoid any lateral loss of liquid or vapor. The upper surface of the flat sheet membrane 302 or porous material may be exposed to the ambient gas phase in the test cell 304.

The procedure for determining a pore-related parameter such as the pore size or pore-size distribution of the flat sheet membrane 302 or porous material may include the steps as described herein. After the flat sheet membrane 302 or porous material is seated on the flanged surface and sealed circumferentially to avoid lateral loss of liquid or vapor, a volatile wetting liquid that does not interact with the membrane 302 or porous material may be introduced into the shallow cavity under the membrane 302 or porous material by injecting the volatile wetting liquid through the open upper end of the small vertical tube 306 extending outside the test cell 304. Sufficient volatile wetting liquid may be added to cause capillary action to draw this liquid into the continuous pores by capillary action. After a sufficient amount of the volatile wetting liquid is injected into the cavity underlying the membrane 302 or porous material, a nonvolatile wetting liquid that is immiscible and non-interacting with the volatile wetting liquid may be injected via a syringe or similar device into the open end of the small vertical tube 306 extending outside the test cell 304.

As such, the method may include first injecting a volatile wetting liquid followed immediately by injecting a non-volatile wetting liquid. The volatile wetting liquid may fill all the continuous pores. Any dead-end pores on the upper surface of the membrane 302 or porous material may not be filled with any of the wetting volatile liquid since the volatile wetting liquid injected from underneath the membrane 302 or porous material has no way to reach the dead-end pores on the upper surface of the membrane 302 or porous material.

Dead-end pores on the underside of the membrane 302 or porous material may be filled by the volatile wetting liquid. However, the liquid in these dead-end pores on the underside of the membrane or porous material may not be able to evaporate since the opening of these pores on the underside of the membrane 302 or porous material may be blocked by the non-volatile wetting liquid. As the volatile wetting liquid evaporates progressively from the largest continuous pores to the smallest continuous pores, the continuous pores that have been emptied by evaporation of the volatile liquid may be immediately filled by the non-volatile wetting liquid that may be drawn upward into them by capillary action. The non-volatile wetting liquid that has been drawn upward into the pores that have been emptied by evaporation of the volatile wetting liquid may prevent any further evaporation from occurring through these continuous pores because the non-volatile liquid that has replaced the volatile liquid initially in these continuous pores does not evaporate readily. Drawing up the non-volatile liquid into the continuous pores as the continuous pores are progressively emptied by evaporation may avoid or prevent the formation of any t-layer onto the walls of the continuous pores since the continuous pores are not exposed to the vapor phase.

Any volatile wetting liquid that is injected into the cavity underlying the membrane or porous material in excess of that required to saturate all the continuous pores may be drawn into the largest continuous pores and may evaporate from these largest continuous pores. This may cause the mass, volume, and/or number of the largest continuous pores to be overestimated. However, overestimating the largest continuous pores may be avoided either by carefully injecting only the amount of volatile wetting liquid required to saturate all the continuous pores, or by piercing or puncturing the flat sheet membrane 302 or porous material with several holes or pores larger than the largest pores in the membrane 302 or porous material. Any excess volatile wetting liquid in the cavity underlying the membrane 302 or porous material may be drawn upward and may be evaporated through these holes or pores that were pierced/punctured through the membrane or porous material. The evaporation rate during the emptying of these holes or pores pierced through the membrane 302 or porous material may be used to determine the mass-transfer coefficient for the test cell as described in greater detail below. The mass-transfer coefficient for the test cell may be used to relate the instantaneous evaporation rate to the diameter of the continuous pores that are being emptied by evaporation.

The procedure for data acquisition and analysis to characterize a pore-related parameter, such the pore size and pore-size distribution of the flat sheet membranes and porous materials, may be similar to US2013/0042670 A1, WO 2015/053709 A1 and PCT Application No. PCT/SG2017/050037, which are incorporated in their entirety herein.

One variation involved in the procedure for determining the pore-related parameter of only the continuous pores according to various embodiments is the manner in which the mass-transfer coefficient for the test cell is determined. In U.S. Patent Application Pub. No. US2013/0042670 A1, the mass-transfer coefficient may be determined from the evaporation rate of a thin film of the volatile wetting liquid that initially overlies the membrane or porous material sample. The procedure for determining the mass-transfer coefficient as disclosed in US2013/0042670 A1 may necessarily fill the dead-end pores on the upper surface of the membrane or porous material with the volatile wetting liquid.

In order to avoid any penetration of the volatile wetting liquid into the dead-end pores on the upper surface of the membrane 302 or porous material, various embodiments may instead include (initially) determining the mass-transfer coefficient from the evaporation rate of a thin film of the volatile wetting liquid placed at the bottom of the test cell 304 in the absence of any membrane 302 or porous material in the test cell. The same value of the mass-transfer coefficient determined in this way may describe or apply to the mass transfer when the membrane 302 or porous material is placed in the chamber 308a or test cell 304, since the mass-transfer rate is controlled by the small hole in the lid of the test cell 304.

Alternatively, if the flat sheet membrane 302 or porous material is pierced or punctured with several holes or pores larger than the largest pores in the membrane or porous material, the mass-transfer coefficient for the test cell may be determined from the evaporation rate of the volatile wetting liquid filled or saturated in these large holes or pores that were pierced into the membrane 302 or porous material, as well as any volatile wetting liquid remaining in the shallow cavity underlying the membrane 302.

In various embodiments, the method of determining a pore-related parameter such as the pore-size distribution, average pore diameter and/or bulk porosity of the continuous pores present in the flat sheet porous membrane or a similar porous material may be as follows:

1. Employ a test cell including a vertical chamber that may be a cylinder or similar geometry that is attached and sealed to a removable base plate, and which may have a removable lid with one or more small holes to control the mass transfer from the test cell and to ensure that local thermodynamic equilibrium prevails at the bottom of the test cell.
2. The base plate may have a cavity that is connected via a channel or tubing through a lateral opening in the walls defining the cavity to a small vertical open tube that may permit or allow injecting liquid into the cavity. The cavity may underlie the flat sheet membrane or the similar porous material whose pore-related parameters are to be determined by evapoporometry.
3. In order to determine only the continuous pores in a flat sheet membrane or similar porous material, a volatile wetting liquid that does not interact with the membrane or similar porous material, as well as a non-volatile wetting liquid that does not interact with the membrane or similar porous material may be chosen. The non-volatile liquid may be immiscible and may not interact with the volatile wetting liquid.
4. In order to determine the mass-transfer coefficient that characterizes the mass transfer in the test cell, the bottom of the empty test cell (i.e., without the membrane or similar porous material) may be covered with a thin layer of the volatile wetting liquid. The open end of the vertical tube connected to the base plate may be temporarily sealed off to avoid any loss of vapor through it.
5. Record the barometric pressure.
6. Place the test cell with the layer of volatile liquid at the bottom onto the pan of a high resolution microbalance that is enclosed with the test cell in an environmental chamber, which may be configured to control the temperature.

7. For increased accuracy, the environmental chamber containing the microbalance and test cell may be placed on a vibration-isolation table.
8. Begin recording the instantaneous mass of the test cell, which may decrease owing to evaporation of the volatile liquid, using the microbalance.
9. Determine the instantaneous evaporation rate of the volatile liquid from the recorded data of the instantaneous mass of the test cell as a function of time.
10. Determine the vapor pressure of the volatile liquid at the temperature of the environmental chamber from appropriate thermodynamic data in standard references.
11. Determine the mole fraction of volatile liquid in the gas phase at the surface of the volatile wetting liquid from the vapor pressure and the recorded barometric pressure.
12. Determine the mass-transfer coefficient that characterizes the transfer of the vapor of the volatile liquid from the bottom of the test cell, through the vapor space in the test cell, and into the ambient gas phase from an evaporation rate that is constant during a time, as well as the mole fraction of the volatile liquid in the gas phase at the surface of the layer of volatile liquid during the time. This mass-transfer coefficient may also characterize the mass transfer in the test cell during the evapoporometry determination of the pore-related parameter, such as the pore-size distribution and/or related properties of the flat sheet membrane or similar porous material.
13. Place the flat sheet membrane or similar porous material, whose pore-related parameter is to be determined horizontally at the bottom of the vertically oriented test cell, and secure the flat sheet membrane or similar porous material to avoid any lateral loss of the volatile liquid or its vapor.
14. Inject the volatile wetting liquid through the open end of the vertical tube connected to the cavity in the base plate of the test cell, so that all the continuous pores may be filled from the underside of the flat sheet membrane or similar porous material. This step in the procedure may avoid filling any of the dead-end pores on the upper surface of the flat sheet membrane or similar porous material with the volatile wetting liquid, and thereby may permit determining the pore-related parameter, such as pore-size distribution and/or related properties of only the continuous pores.
15. Once all the continuous pores in the flat sheet membrane or similar porous material have been filled with the volatile wetting liquid, a non-volatile wetting liquid that is immiscible and non-interacting with the volatile wetting liquid may be injected through the open end of the vertical tube connected to the cavity in the base plate. The amount of non-volatile wetting liquid in the cavity may be sufficient to progressively fill the continuous pores in the flat sheet membrane or similar porous material owing to the volatile wetting liquid evaporating during the evapoporometry procedure. If the non-volatile wetting liquid is denser than the volatile wetting liquid, it may be injected with the flat sheet membrane or similar porous material facing upward to ensure that the volatile wetting liquid overlies the non-volatile wetting liquid, thereby ensuring that the membrane or similar porous material is in contact with the volatile wetting liquid. If the non-volatile wetting liquid is less dense that the volatile wetting liquid, it may be injected with the flat sheet membrane or similar porous materials facing downward to ensure that the non-volatile wetting liquid overlies the volatile wetting liquid thereby ensuring that the membrane or similar porous material is in contact with the volatile wetting liquid.
16. The test cell with the flat sheet membrane or similar porous material whose continuous pores have been saturated with the volatile liquid may be placed on the pan of a high resolution microbalance that is enclosed in an environmental chamber to control the temperature.
17. For increased accuracy in determining the pore-size distribution, the environmental chamber containing the microbalance and test cell may be placed on a vibration-isolation table.
18. Begin recording the instantaneous mass of the test cell, which may decrease owing to evaporation of the volatile liquid from the liquid-saturated continuous pores in the flat sheet membrane or similar porous material, using the microbalance.
19. Any excess volatile wetting liquid in the cavity in the base plate may evaporate through the largest continuous pores in the flat sheet membrane or similar porous material. This may cause the mass of the largest continuous pores in the flat sheet membrane or porous material to be overestimated. This small error in determining the pore-related parameter may be avoided by puncturing the flat sheet membrane or similar porous material with several holes considerably larger than the largest pores expected in the flat sheet membrane or similar porous material whose pore-related parameter is to be determined. The excess volatile liquid in the cavity may fill the punctured holes. The excess volatile wetting liquid may evaporate from these holes first together with any remaining excess volatile wetting liquid in the cavity underlying the flat sheet membrane or similar porous material.
20. Determine the instantaneous evaporation rate of the volatile liquid from the recorded data for the instantaneous mass as a function of time.
21. Determine the instantaneous mole fraction of the volatile liquid in the gas phase at the surface of the flat sheet membrane or porous material based on the instantaneous evaporation rate and the value of the mass-transfer coefficient determined in steps 4 through 12.
22. Determine the diameter of the continuous pores from which the volatile liquid is evaporating at any instant of time based on the value of the instantaneous mole fraction of the volatile liquid in the gas phase at the surface of the flat sheet membrane or similar porous material and the value of the mole fraction of the volatile liquid in the gas phase at the surface of the liquid layer in step 11 using the Kelvin equation that relates the vapor pressure over a curved interface of a volatile liquid in a pore to the diameter of the pore.
23. Determine the total mass of the pores from which the volatile liquid is evaporating at any instant of time by determining the difference in mass between two consecutive pore diameters and set this difference to be equal to the mass in a pore having a diameter equal to the average of the two consecutive pore diameters.
24. Plot the pore-size distribution of the mass associated with each pore size normalized with respect to the total mass in all the pores as a function of the pore diameter.
25. Determine the mass-average pore diameter by dividing the product of the pore diameter and the mass associated with that pore diameter by the total mass in all the pores.
26. Determine the bulk porosity of the porous membrane or porous material by dividing the total mass in all the pores by the product of the mass density of the volatile liquid and the total volume of the porous membrane or porous material sample.

Various embodiments may relate to an arrangement for, and/or the method to determine the pore-related parameter of one or more hollow fibers (alternatively referred to as hollow fiber membranes). The test cell or chamber for, and/or the method to determine the pore-related parameter of one or more hollow fiber membranes may be modified from that used to determine the sheet membrane.

Figure 4A:
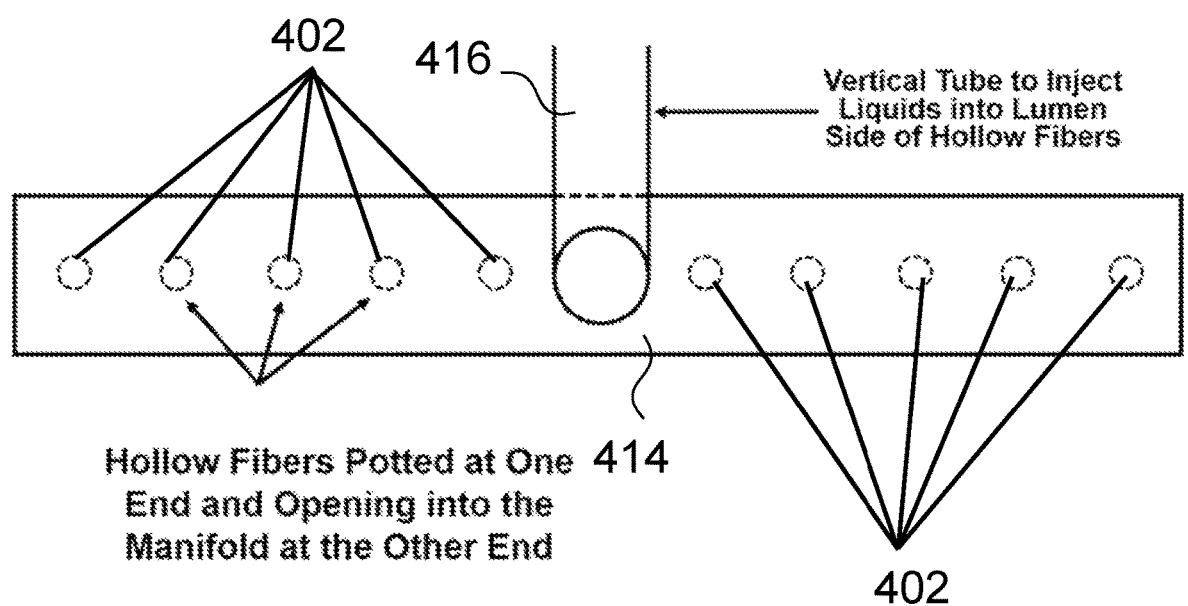
FIG. 4A shows a back view of a distribution manifold according to various embodiments.
Figure 4B:
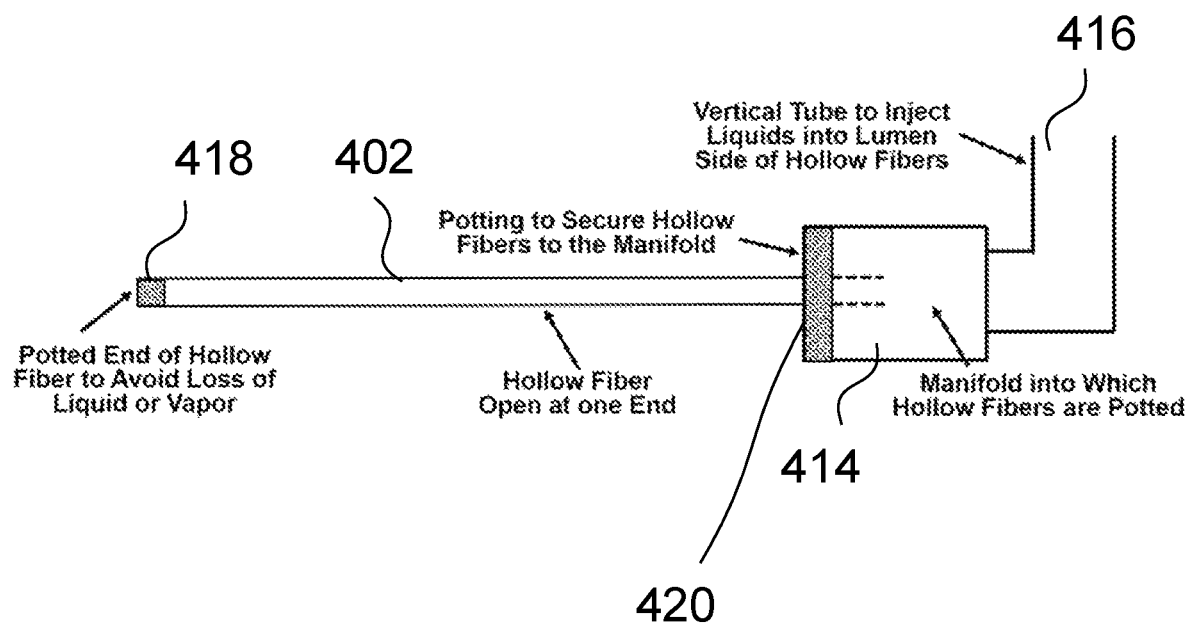
FIG. 4B shows a side view of the distribution manifold according to various embodiments.

FIG. 4A shows a back view of a distribution manifold 414 according to various embodiments. A plurality or array of hollow fibers 402 may be inserted to a front surface of the distribution manifold 414. A tube 416 may be inserted or attached to a back surface of the manifold. Liquids such as the volatile liquid and the non-volatile liquid may be injected or provided to the tube 416, which may configured to carry the liquid through the distribution manifold 414 to the plurality or array of hollow fibers. FIG. 4B shows a side view of the distribution manifold 414 according to various embodiments. A distal end of each of the hollow fibers 402 may be sealed by a seal 418 such as a potting material. Alternatively, the distal end of each of the hollow fibers 402 may be sealed by heat sealing or other appropriate methods.

The plurality of hollow fibers 402 may be aligned in parallel rows to form a horizontal array, so that the hollow fibers 402 are not in contact with one another. The tube 416 may extend horizontally from the manifold 414 over a small distance before bending upwards so that the open end of the tube faces upwards as shown in FIG. 4B. In other words, the tube 416 may be an L-shaped tube. The small tube 416 may be used to introduce a liquid, i.e., the volatile liquid and/or non-volatile liquid, into the distribution manifold 414, which feeds the liquid into the lumen side of all the hollow fibers 402 so that only the continuous pores (and the dead-end pores on the inner surfaces of the fibers 402 facing the lumen) are saturated with the liquid. The continuous pores may extend from the inner surface facing the lumen to the outer surface of each hollow fiber 402. The proximal ends of the hollow fibers 402 may be also sealed or secured to the distribution manifold using a potting material 420.

The procedure for data acquisition and analysis to characterize a pore-related parameter, such the pore size and pore-size distribution of the flat sheet membranes and porous materials, may be similar to WO 2015/053709 A1 and PCT Application No. PCT/SG2017/050037. The procedure for determining a pore-related parameter such as the pore size or pore-size distribution of the continuous pores of the hollow fiber membranes may be as described herein. After each of the hollow fibers 402 is sealed at one end, i.e., distal end, to avoid lateral loss of liquid or vapor, and has been secured to the distribution manifold 414 (into which the open ends of the hollow fibers 402 penetrate) using a suitable potting material, a volatile wetting liquid that does not interact with the hollow fibers may be introduced into the distribution manifold 414 by injecting the volatile wetting liquid through the open upper end of the small vertical tube 416 extending from the distribution manifold 414. The distribution manifold 414 may feed the volatile liquid to the lumen side of each of the hollow fibers 402 in the array. Sufficient volatile wetting liquid may be added to draw the volatile liquid into the continuous pores in the annular walls of the hollow fibers 402 by capillary action. After a sufficient amount of the volatile wetting liquid has been injected to saturate all the continuous pores in the annular walls of the hollow fibers 402, a non-volatile wetting liquid that is immiscible and non-interacting with the volatile wetting liquid may be injected via a syringe or similar device into the open end of the small vertical tube 416. The procedure that involves first injecting a volatile liquid followed immediately by injecting a non-volatile liquid may fill all the continuous pores in the annular walls of the hollow fibers 402 with the volatile liquid. Any dead-end pores on the outer surface of the hollow fibers 402 may not be filled with any of the volatile liquid since the volatile liquid injected from the lumen side has no way to reach the dead-end pores on the outer surface of the hollow fibers 402. Dead-end pores on the lumen side of the hollow fibers 402 may be filled by the volatile wetting liquid. However, the volatile liquid in these dead-end pores on the lumen side of the hollow fibers 402 may not be able to evaporate since the opening of these pores on the lumen side of the hollow fibers 402 may be blocked by the non-volatile liquid.

As the volatile liquid evaporates progressively from the largest continuous pores to the smallest continuous pores, the continuous pores that have been emptied by evaporation of the volatile liquid may be immediately filled by the non-volatile liquid that is drawn into the continuous pores by capillary action. The non-volatile wetting liquid that has been drawn into the continuous pores that have been emptied by evaporation of the volatile wetting liquid may prevent any further evaporation from occurring through these continuous pores because the liquid that has replaced the volatile liquid initially in these pores is non-volatile. Drawing up the non-volatile liquid into the continuous pores as the continuous pores are progressively emptied by evaporation may help avoid the formation of any t-layer owing to adsorption of vapor onto the walls of the pores, since the continuous pores are never exposed to the vapor phase. The procedure for preparing the array of hollow fibers 402, filling the hollow fibers 402 with the volatile liquid, and then filling the hollow fibers 402 with the non-volatile liquid may be done with the array of hollow fibers 402 removed from the test cell. The filled array of hollow fibers 402 may then be placed at the bottom of the test cell in a manner to ensure that none of the fibers 402 touches the base of the test cell.

The procedure for data acquisition and analysis to characterize a pore-related parameter, such the pore size and pore-size distribution of the flat sheet membranes and porous materials, may be similar to WO 2015/053709 A1 and PCT Application No. PCT/SG2017/050037, which are incorporated in their entirety herein.

One variation involved in the procedure for determining the pore-related parameter of only the continuous pores according to various embodiments is the manner in which the mass-transfer coefficient for the test cell is determined. In WO 2015/053709 A1 and PCT Application No. PCT/SG2017/050037, the mass-transfer coefficient may be determined from the evaporation rate of a thin film of the volatile wetting liquid underlying the array of hollow fibers. The procedure for determining the mass-transfer coefficient in WO 2015/053709 A1 and PCT Application No. PCT/SG2017/050037 may necessarily fill the dead-end pores on the outer surface of the hollow fibers 406 via adsorption and capillary condensation of the vapor emanating from the evaporating thin film of the volatile liquid.

In order to avoid any volatile wetting liquid from penetrating into or filling the dead-end pores on the outer surface of the hollow fibers, various embodiments may provide a method including determining the mass-transfer coefficient based on the evaporation rate of a thin film of the volatile wetting liquid placed at the bottom of the test cell in the absence of the array of hollow fibers in the test cell. The same value of the mass-transfer coefficient determined in this way may also describe or apply to the mass transfer when the array of hollow fibers is placed in the test cell, since the mass-transfer rate is controlled by the small hole in the lid of the test cell.

Various embodiments may provide a method of determining a pore-related parameter, such as the pore-size distribution, average pore diameter, or bulk porosity of the continuous pores of the hollow fiber membranes or similar porous material as follows:

1. Employ a test cell including a vertical chamber that may be a cylinder or similar geometry that is attached and sealed to a removable base plate, and which may have a removable lid with one or more small holes to control the mass transfer from the test cell and to ensure that local thermodynamic equilibrium prevails at the bottom of the test cell.
2. Employ a manifold into which several hollow fiber membranes or similar porous material may be attached to and sealed using an appropriate sealant or potting material. The manifold may be attached to a vertical tube with an open end that may permit injecting liquid.
3. In order to determine a pore-related parameter of only the continuous pores in hollow fiber membranes or similar porous material, a volatile wetting liquid that does not interact with the membranes or similar porous material may be chosen. A non-volatile wetting liquid that does not interact with the membranes or similar porous material, is immiscible, and does not interact with the volatile wetting liquid may also be selected.
4. In order to determine the mass-transfer coefficient that characterizes the mass transfer in the test cell, the bottom of the empty test cell may be covered with a thin layer of the volatile wetting liquid.
5. Record the barometric pressure.
6. Place the test cell with the layer of volatile liquid at the bottom onto the pan of a high resolution microbalance. The test cell and the microbalance may be enclosed in an environmental chamber to control the temperature.
7. For increased accuracy, the environmental chamber containing the microbalance and test cell may be placed on a vibration-isolation table.
8. Begin recording the instantaneous mass of the test cell via the microbalance. The mass may progressively decrease owing to evaporation of the volatile liquid.
9. Determine the instantaneous evaporation rate of the volatile liquid from the recorded data of the instantaneous mass as a function of time.
10. Determine the vapor pressure of the volatile liquid at the temperature of the environmental chamber from appropriate thermodynamic data in standard references.
11. Determine the mole fraction of volatile liquid in the gas phase at the surface of the volatile wetting liquid from the vapor pressure and the recorded barometric pressure.
12. Determine the mass-transfer coefficient that characterizes the transfer of the vapor of the volatile liquid from the bottom of the test cell, through the vapor space in the test cell, and into the ambient gas phase from the measured constant evaporation rate and mole fraction of the volatile liquid at the surface of the layer of volatile liquid. This mass-transfer coefficient may also characterize the mass transfer in the test cell during the evapoporometry determination of the pore-related parameter of the hollow fiber membranes or similar porous material.
13. The distal end of each of the hollow fiber membranes or similar porous material may be closed using heat-sealing or using an appropriate sealant or potting material, so that evapoporometry may be used to determine a pore-related parameter of the hollow fiber membranes or similar porous material.
14. Insert the open ends of several hollow fibers, one end of which has been sealed, through the holes in the manifold described in step 2. The hollow fiber membranes or similar porous material may be secured or sealed to the wall or surface of the manifold using a sealant or appropriate potting material. The open or proximal end of the hollow fibers or similar porous material may extend into the cavity of the manifold.
15. The volatile wetting liquid may be injected through the open end of the vertical tube connected to the cavity in the manifold so that all the continuous pores are filled from the lumen side of the hollow fiber membranes or similar porous material. This step in the procedure may help avoid filling any of the dead-end pores on the outer surface of the hollow fiber membranes or similar porous material with the volatile wetting liquid to determine the pore-related parameter of only the continuous pores.
16. Once all the continuous pores in the hollow fiber membranes or similar porous material have been filled with the volatile wetting liquid, the open end of the vertical tube connected to the cavity in the manifold may be injected with a non-volatile wetting liquid that is immiscible and non-interacting with the volatile wetting liquid. The amount of non-volatile wetting liquid used may be sufficient to progressively fill the cavity in the manifold and the continuous pores in the hollow fiber membranes or similar porous material owing to the volatile wetting liquid evaporating during the evapoporometry procedure.
17. The manifold with the hollow fiber membranes or similar porous material, whose continuous pores have been saturated with the volatile wetting liquid may be placed at the bottom of the vertically oriented test cell described in step 1.
18. The test cell with the manifold containing the hollow fiber membranes or similar porous material may be placed on the pan of a high resolution microbalance. The test cell and the microbalance may be enclosed in an environmental chamber to control the temperature.
19. For increased accuracy in determining the pore-size distribution place, the environmental chamber containing the microbalance and test cell may be placed on a vibration-isolation table.
20. Begin recording the instantaneous mass of the test cell via the microbalance that may decrease due to evaporation of the volatile liquid from the liquid-saturated continuous pores in the hollow fiber membranes or similar porous material.
21. The excess volatile wetting liquid in the cavity of the manifold may evaporate through the largest pores in the flat sheet membrane or porous material, which may cause the mass of the largest pores in the hollow fiber membranes or similar porous material to be overestimated. This small error in determining the pore-related parameter may be avoided by puncturing each of the hollow fiber membranes or similar porous material with several holes considerably larger than the largest pores expected in the hollow fiber membranes or similar porous materials whose pore-related parameter are to be determined. The volatile wetting liquid saturated in these holes may evaporate from these holes along with any remaining excess volatile wetting liquid in the cavity of the manifold. The non-volatile wetting liquid may be drawn into the cavity in the manifold as the volatile wetting liquid evaporates, thus preventing evaporation of the volatile liquid from the dead-end pores on the lumen side of the hollow fiber membranes or similar porous material.

22. Determine the instantaneous evaporation rate of the volatile liquid from the recorded data for the instantaneous mass as a function of time.
23. Determine the instantaneous mole fraction of the volatile liquid in the gas phase at the outer surface of the hollow fiber membranes or similar porous material from the instantaneous evaporation rate and the value of the mass-transfer coefficient determined in steps 4 through 12.
24. Determine the diameter of the pores from which the volatile liquid is evaporating at any instant of time based on the value of the instantaneous mole fraction of the volatile liquid at the outer surface of the hollow fiber membranes or similar porous material and the value of the mole fraction of the volatile liquid at the surface of the liquid layer in step 11 using the Kelvin equation that relates the vapor pressure over a curved interface of a volatile liquid in a pore to the diameter of the pore.
25. Determine the total mass of the pores from which the volatile liquid is evaporating at any instant of time from a difference in mass between two consecutive pore diameters and set the difference to be equal to the mass in the pore having a diameter equal to the average of the two consecutive pore diameters.
26. Plot the pore-size distribution as the mass associated with each pore size normalized with respect to the total mass in all the pores as a function of the pore diameter.
27. Determine the mass-average pore diameter by dividing the product of the pore diameter and the mass associated with that pore diameter by the total mass in all the pores.
28. Determine the bulk porosity of the hollow fiber membranes or similar porous material by dividing the total mass in all the pores by the product of the mass density of the volatile liquid and the total volume of the porous membrane or porous material sample.

Figure 5A:
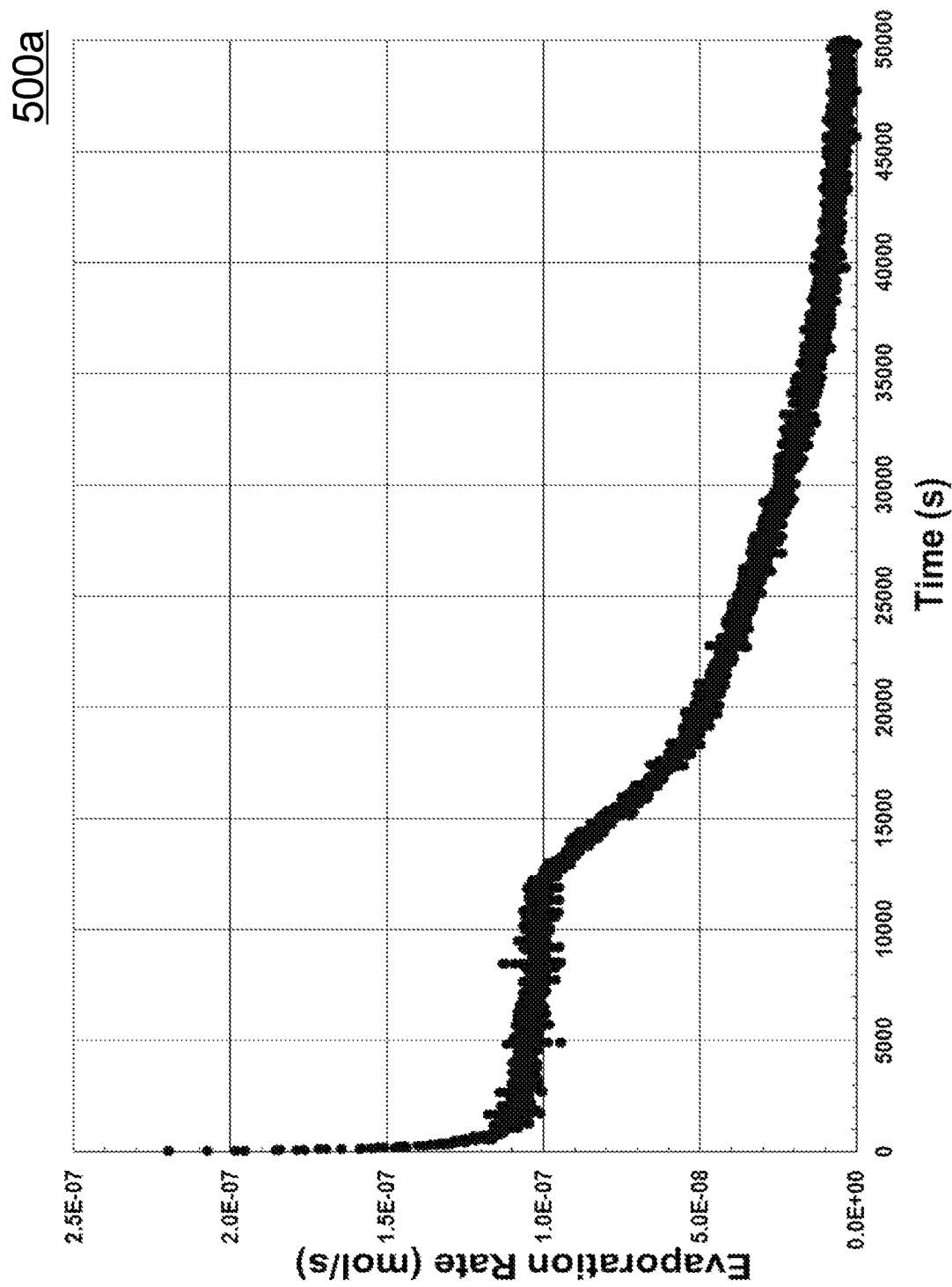
FIG. 5A is a plot of evaporation rate (in moles per second or mol/s) as a function of time (in seconds or s) for characterization of the pore-size distribution (PSD) via evapoporometry (EP) according to various embodiments.
Figure 5B:
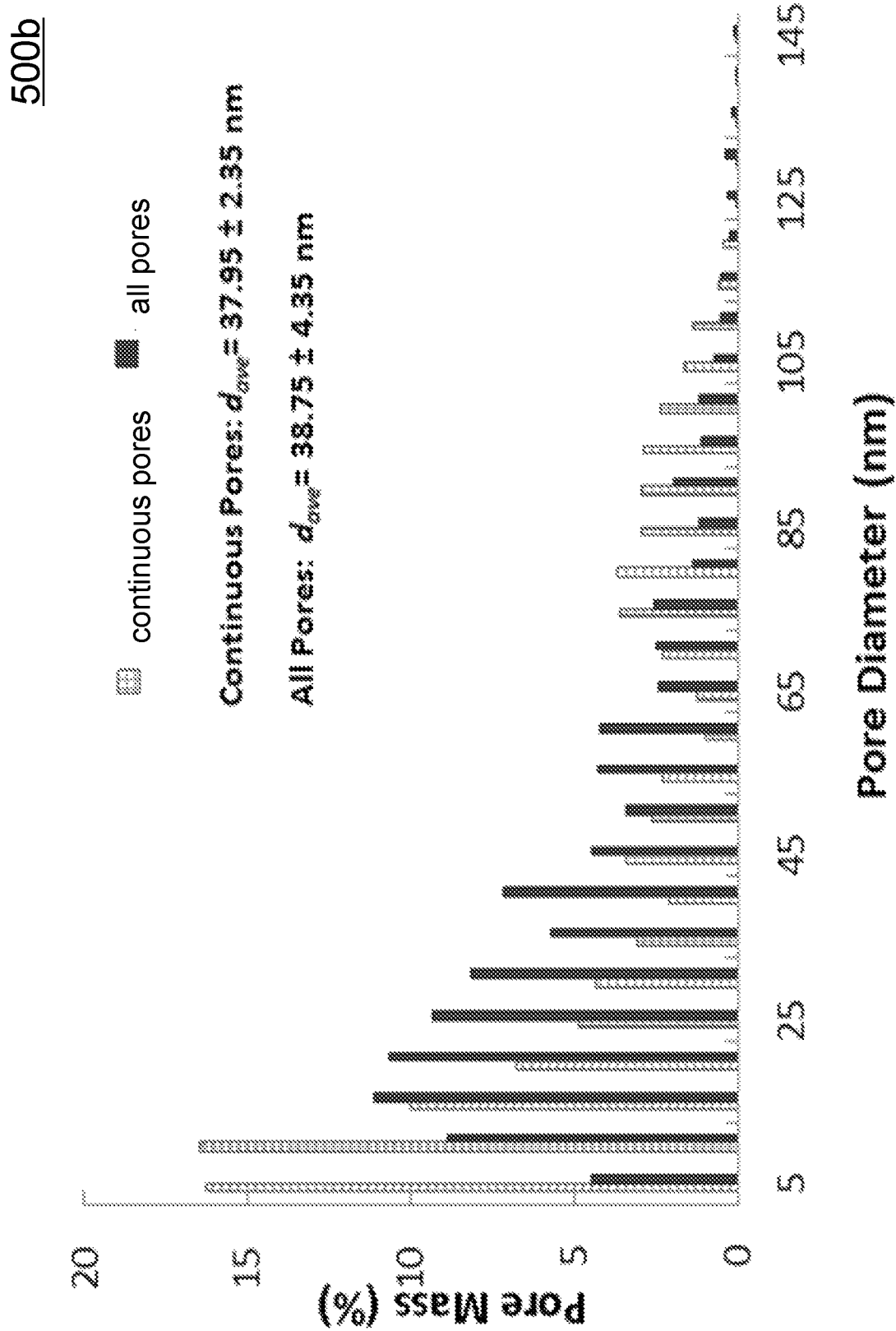
FIG. 5B is a plot of pore mass (in percent or %) as a function of pore diameter (in nanometer or nm) showing the pore-size distribution (PSD) of a sample obtained via a conventional evapoporometry method involving all pores and the pore-size distribution (PSD) of the sample obtained via a evapoporometry method involving only the continuous pores according to various embodiments.

FIG. 5A is a plot 500a of evaporation rate (in moles per second or mol/s) as a function of time (in seconds or s) for characterization of the pore-size distribution (PSD) via evapoporometry (EP) according to various embodiments. FIG. 5B is a plot 500b of pore mass (in percent or %) as a function of pore diameter (in nanometer or nm) showing the pore-size distribution (PSD) of a sample obtained via a conventional evapoporometry method involving all pores and the pore-size distribution (PSD) of the sample obtained via a evapoporometry method involving only the continuous pores according to various embodiments. Note that the percentage shown by bars in FIG. 5B for each pore size is relative to the total mass for all pore sizes of each measurement.

The membrane characterized here is a 500 kDa flat-sheet polymeric (PES) membrane obtained from PALL Corporation (USA). The conventional method for measuring PSD of all pores, i.e., both continuous and dead-end pores, is described in U.S. Patent Application Pub. No. US2013/0042670 A1.

It may be observed in FIG. 5B that at smaller pore size diameter (~<10 nm), the continuous pores measurement bars (patterned) are higher than the all-pore measurement bars (solid). This may be due to that more of the smaller pores are continuous. This may make sense since it is more difficult for a larger pore to be continuous from one side of the membrane to the other.

This observation may not be due to the removal of the t-layer in the continuous pores measurement. The presence of the t-layer may usually cause non-real small pores to appear in the PSD owing to evaporation from the t-layer whose thickness is initially around 4 nm and then subsequently thins. This evaporation from the t-layer appears as pores having a diameter less than approximately 4 nm. If the t-layer effects are eliminated, the small pore tail of the PSD would be decreased rather than be increased.

Although the mean pore diameters measured by both methods are relatively close for the two samples, the mass inside the pores measured via EP for the continuous pores measurement is 30 percent less compared to the conventional all pores measurement for the same membrane (the mass measured for the continuous pores measurement and the all pores measurement are 0.056 and 0.08 gr respectively).

This may be indicative that quite a few of the larger pores are not continuous. The mass in a pore is proportional to the square of the diameter. Hence, if the dead-end pores tend to be the larger pores, there may be a marked reduction in the total mass measured via EP when only the continuous pores are considered.

The accuracy of the EP measurement carried out using the continuous pores method may be on par compared to the all pores method. The difference may be due to the pores characterized. The continuous pores technique may be sensitive only to the continuous pores. It appears that more of the smaller pores are continuous relative to the larger pores. This may account for the shift of the PSD towards smaller pores and for the rather large decrease in the total pore mass.

The higher percentage of small pores may be because only the continuous pores are measured rather than all the pores (including continuous and dead-end pores) and may not be because of the t-layer elimination. The t-layer elimination is a benefit of this continuous pores method. The continuous pores method seeks to measure the PSD of continuous pores. While the continuous pores method shows higher percentage of smaller pores (<10 nm), it does not mean that they are more compared to measuring using the all pores method. In fact, the absolute value of mass in any pore size pore may have decreased, but it may be possible that relative percentage has increased for some pore sizes.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for determining at least one pore-related parameter of a porous structure, the method comprising:
   arranging the porous structure in a test cell so that a first space is at least partially defined by a first surface of the porous structure and a second space is at least partially defined by a second surface of the porous structure opposite the first surface;
   supplying a volatile liquid to the first space so that one or more continuous pores of the porous structure are filled with the volatile liquid;

supplying a non-volatile liquid to the first space so that the non-volatile liquid fills the one or more continuous pores of the porous structure after the volatile liquid evaporates from the one or more continuous pores of the porous structure;

determining an effective mass of the test cell over a period of time due to evaporation of the volatile liquid from the one or more continuous pores; and determining the at least one pore-related parameter of the porous structure based on the effective mass determined.

2. The method according to claim 1,
wherein the porous structure is a flat sheet membrane.

3. The method according to claim 2,
wherein the test cell comprises a base including a cavity, and a chamber;
wherein arranging the flat sheet membrane in the test cell comprises:
    arranging the flat sheet membrane over the cavity so that the first space comprises the cavity; and
    securing the flat sheet membrane to the base.

4. The method according to claim 3,
wherein the base comprises an inlet channel configured to direct the volatile liquid and the non-volatile liquid to the cavity.

5. The method according to claim 1,
wherein the porous structure is a hollow fiber;
wherein the first surface is an inner surface of the hollow fiber; and
wherein the second surface is an outer surface of the hollow fiber.

6. The method according to claim 5,
wherein arranging the hollow fiber in the test cell comprises:
    sealing a first end of the hollow fiber using a seal comprising a suitable sealant material or a suitable potting material;
    attaching a second end of the hollow fiber to a fluid delivery device.

7. The method according to claim 6,
wherein the fluid delivery device is configured to direct the volatile liquid and the non-volatile liquid to the first space is at least partially defined by the inner surface of the hollow fiber and the seal.

8. The method according to claim 1,
wherein supplying the volatile liquid into the first space comprises supplying the volatile liquid so that the volatile liquid comes into contact with the first surface of the porous structure.

9. The method according to claim 1, further comprising:
forming a hole on the porous structure before supplying the volatile liquid and the non-volatile liquid;
wherein a diameter of the hole is greater than a diameter of each of the one or more continuous pores.

10. The method according to claim 1,
wherein the volatile liquid supplied is equal to an amount required to saturate the one or more continuous pores, and one or more dead-end pores on the first surface of the porous structure.

11. The method according to claim 1, further comprising controlling evaporation of the volatile liquid in the test cell.

12. The method according to claim 11,
wherein controlling evaporation of the volatile liquid in the test cell comprises arranging a diffusional resistance element spaced over the porous structure; and wherein the diffusional resistance element is configured to resist diffusion of vapour of the volatile liquid.

13. The method according to claim 1, further comprising:
determining an evaporation rate from the effective mass determined; and
relating the evaporation rate to a vapour pressure of the volatile liquid at an interface between the volatile liquid in the porous structure and an ambient gas phase within the test cell;
wherein determining the at least one pore-related parameter of the porous structure comprises determining the at least one pore-related parameter based on the vapour pressure determined.

14. The method according to claim 1, further comprising:
determining an evaporation rate from the effective mass determined; and
relating the evaporation rate to a mole fraction of the volatile liquid at an interface between the volatile liquid in the porous structure and an ambient gas phase within the test cell;
wherein determining the at least one pore-related parameter of the porous structure comprises determining the at least one pore-related parameter based on the mole fraction determined.

15. The method according to claim 1,
wherein determining an effective mass of the test cell comprises determining the effective mass of the test cell at a series of time intervals to generate a plurality of instantaneous masses.

16. The method according to claim 15,
wherein the at least one pore-related parameter comprises a pore-size distribution; and
wherein determining the pore-size distribution of the porous structure comprises:
    associating a respective instantaneous mass of the generated plurality of instantaneous masses to a respective pore diameter of the porous structure; and
    determining the pore-size distribution based on the plurality of instantaneous masses generated and the associated pore diameters.

17. The method according to claim 1,
wherein the at least one pore-related parameter comprises a mass-average pore diameter or a bulk porosity.

18. The method according to claim 1,
wherein the at least one pore-related parameter of the porous structure is a parameter of the one or more continuous pores of the porous structure.

19. The method according to claim 1,
wherein the non-volatile liquid is supplied to the first space after the volatile liquid is supplied.

20. An arrangement for determining at least one pore-related parameter of a porous structure, the arrangement comprising:
    a test cell comprising the porous structure so that the test cell comprises a first space at least partially defined by a first surface of the porous structure and a second space at least partially defined by a second surface of the porous structure opposite the first surface;
    a fluid delivery device configured to supply a volatile liquid into the first space so that one or more continuous pores of the porous structure are filled with the volatile liquid, and further configured to supply a non-volatile liquid into the first space so that the non-volatile liquid fills the one or more continuous pores of the porous structure after the volatile liquid evaporates from the one or more continuous pores of the porous structure; and a mass-determination device configured to determine an effective mass of the test cell over a period of time due to evaporation of the volatile liquid from the one or more continuous pores;

wherein the at least one pore-related parameter of the porous structure is determined based on the effective mass determined.

* * * * *